(12) United States Patent
Ohtsuki et al.

(10) Patent No.: US 7,178,986 B2
(45) Date of Patent: Feb. 20, 2007

(54) ROLLING BEARING

(75) Inventors: Masaaki Ohtsuki, Osaka (JP); Shinji Fukuda, Osaka (JP); Hiroyuki Urano, Osaka (JP); Hiroshi Ueno, Osaka (JP); Thomas Grabosch, Rottenbach (DE); Antonet Wijnen, Amstelveen (NL)

(73) Assignee: Koyo Seiko Co., Ltd., Osaka (JP)

( * ) Notice: Subject to any disclaimer, the term of this patent is extended or adjusted under 35 U.S.C. 154(b) by 228 days.

(21) Appl. No.: 10/492,461

(22) PCT Filed: Feb. 12, 2003

(86) PCT No.: PCT/JP03/01416

§ 371 (c)(1),
(2), (4) Date: Apr. 13, 2004

(87) PCT Pub. No.: WO03/069176

PCT Pub. Date: Aug. 21, 2003

(65) Prior Publication Data
US 2004/0247215 A1 Dec. 9, 2004

(30) Foreign Application Priority Data
Feb. 15, 2002 (JP) .............................. 2002-37898

(51) Int. Cl.
*F16C 19/00* (2006.01)

(52) U.S. Cl. ...................................... 384/470; 384/572
(58) Field of Classification Search ................ 384/470, 384/463, 520, 523, 527, 572, 551, 576, 907
See application file for complete search history.

(56) References Cited

U.S. PATENT DOCUMENTS

| | | | | |
|---|---|---|---|---|
| 3,239,288 A | * | 3/1966 | Campbell et al. ............ 384/527 |
| 3,542,443 A | * | 11/1970 | Eklund ........................ 384/463 |
| 4,022,516 A | * | 5/1977 | Smith et al. ................. 384/520 |
| 4,615,956 A | * | 10/1986 | Goebel et al. ................ 429/50 |
| 5,165,804 A | * | 11/1992 | Fisher et al. ................. 384/492 |
| 5,356,227 A | * | 10/1994 | Sibley et al. ................ 384/463 |
| 5,669,719 A | * | 9/1997 | Kinno et al. ................. 384/463 |

* cited by examiner

*Primary Examiner*—Richard Ridley
*Assistant Examiner*—Justin Krause
(74) *Attorney, Agent, or Firm*—Jordan and Hamburg LLP

(57) ABSTRACT

In a rolling bearing including a cage arranged in an annular space between an outer ring and an inner ring, a plurality of rolling elements held by the cage, and a solid lubricating agent provided in the cage, the cage has a plurality of rolling element receiving pockets in a circumferential direction, and has recess portions between the rolling element receiving pockets in a circumferential direction, and each of the rolling elements is received in each of the rolling element receiving pockets. The solid lubricating agent is attached to the recess portions in such a manner as to be in a slidable contact with a rolling element raceway surface.

7 Claims, 7 Drawing Sheets

F I G. 8
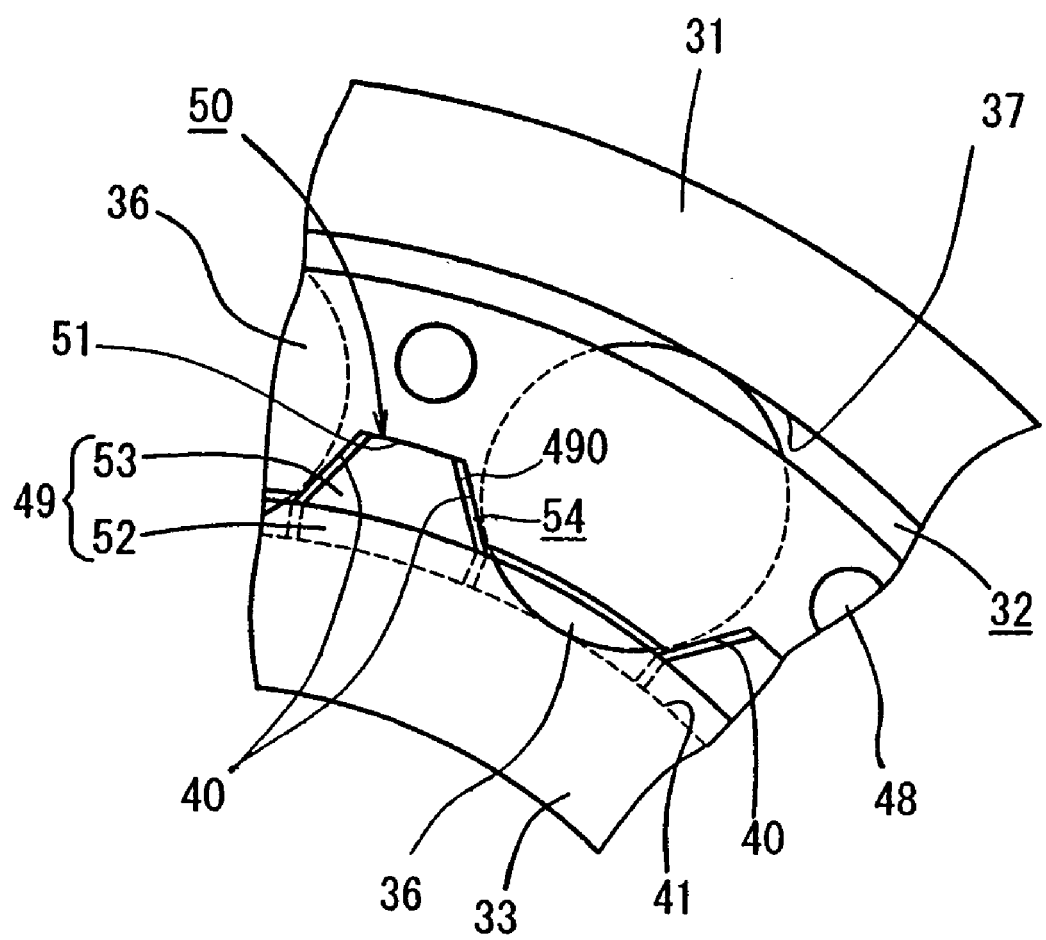

ROLLING BEARING

TECHNICAL FIELD

The present invention relates to a rolling bearing.

BACKGROUND ART

In a rolling bearing used under a high temperature and a high pressure, a raceway surface of a rolling element can not be kept by a lubricating agent, such as a grease, or the like. Accordingly, there is a case that a cage holding the rolling element itself is formed by the lubricating agent. As this kind of lubricating agent, for example, there is employed a graphite, which is fragile but is excellent in a lubricating property. In the rolling bearing mentioned above, there is a case that the rolling element slips against the raceway surfaces of inner and outer rings and a lead-lag is generated, whereby a compression force and a tensile force are applied to the cage. In the case mentioned above, since the cage is formed by the fragile lubricating agent, such as the graphite, or the like, there is a risk that a life of the cage becomes short. There is a case that a spacer formed by the lubricating agent, such as the graphite, or the like is used in place of the cage mentioned above. In this case, there is also a risk that the life of the cage becomes short in the same manner as mentioned above.

DISCLOSURE OF THE INVENTION

A rolling bearing, in accordance with the present invention includes a pair of bearing rings arranged in an inner side and an outer side in a diametrical direction, a cage arranged in an annular space between both the bearing rings, a plurality of roller elements held by the cage, and a solid lubricating agent provided in the cage, the cage has a plurality of rolling element receiving pockets in a circumferential direction and has recess portions between the rolling element receiving pockets in the circumferential direction, the rolling elements are received in the respective rolling element receiving pockets, and the solid lubricating agent is attached to the recess portions in such a manner as to be in a slidable contact with a rolling element raceway surface.

In the structure mentioned above, since the solid lubricating agent is attached to the engaging recess portions of the cage, the solid lubricating agent revolves around an axis, in accordance with a rotation of the cage around the axis, and the solid lubricating agent is slidably in contact with the raceway surface so as to lubricate.

In accordance with a preferable mode of the present invention, the solid lubricating agent has a first lubricating portion, which is slidably in contact with a raceway surface of one bearing ring, and a second lubricating portion, which is slidably in contact with a guide surface in a shoulder portion of the one bearing ring. In accordance with this mode, when the cage rotates around the axis, the solid lubricating agent moves in a state, in which the solid lubricating agent is attaché to the engaging recess portion of the cage, the first lubricating portion of the solid lubricating agent is slidably in contact with the raceway surface of the bearing ring so as to lubricate the raceway surface, and the second lubricating portion is slidably in contact with the guide surface in the shoulder portion of the bearing ring so as to lubricate the guide surface.

In accordance with a further preferable mode of the present invention, the solid lubricating agent is attached to the recess portion in such a manner as to slightly move in a peripheral direction with respect to the cage. In accordance with this mode, when the cage starts rotating, the solid lubricating agent revolves around the axis slightly behind the cage, and lubricates the raceway surface or the guide surface in the shoulder portion of the bearing ring. Even if the lead-lag of the rolling element is generated, no compression force is applied to the solid lubricating agent, and the solid lubricating agent can be prevented from being broken down.

In accordance with a further preferable mode of the present invention, the solid lubricating agent is attached to the recess portion in such a manner as to be slidably in contact with the rolling element. In accordance with this mode, when the cage starts rotating, the solid lubricating agent revolves around the axis slightly behind the cage, and lubricates the raceway surface or the guide surface in the shoulder portion of the bearing ring, and the rolling surface of the rolling element. Even if the lead-lag of the rolling element is generated, no compression force is applied to the solid lubricating agent, and the solid lubricating agent can be prevented from being broken down.

In accordance with a further preferable mode of the present invention, an inclined surface pressing the solid lubricating agent in a diametrical direction, in accordance with the rotating motion of the cage around the axis is provided in the recess portion. In accordance with this mode, in the case that a height of the solid lubricating agent in the diametrical direction is reduced, in accordance with the use of the solid lubricating agent, the solid lubricating agent is pressed in the diametrical direction by the inclined surface, in accordance with the rotation of the cage, and the solid lubricating agent lubricates the raceway surface, or the guide surface in the shoulder portion of the bearing ring, and the rolling surface of the rolling element.

In this case, the bearing ring arranged in the outer side in the diametrical direction among the bearing rings mentioned above is not limited to the annular shaped member and includes a housing or the like. Similarly, the bearing ring arranged in the inner side in the diametrical direction is not limited to the annular shaped member and includes a solid axial body or the like.

BRIEF DESCRIPTION OF THE DRAWINGS

FIG. 8 is a partly enlarged view of the rolling bearing; and

BEST MODE FOR CARRYING OUT THE INVENTION

Figure 1:
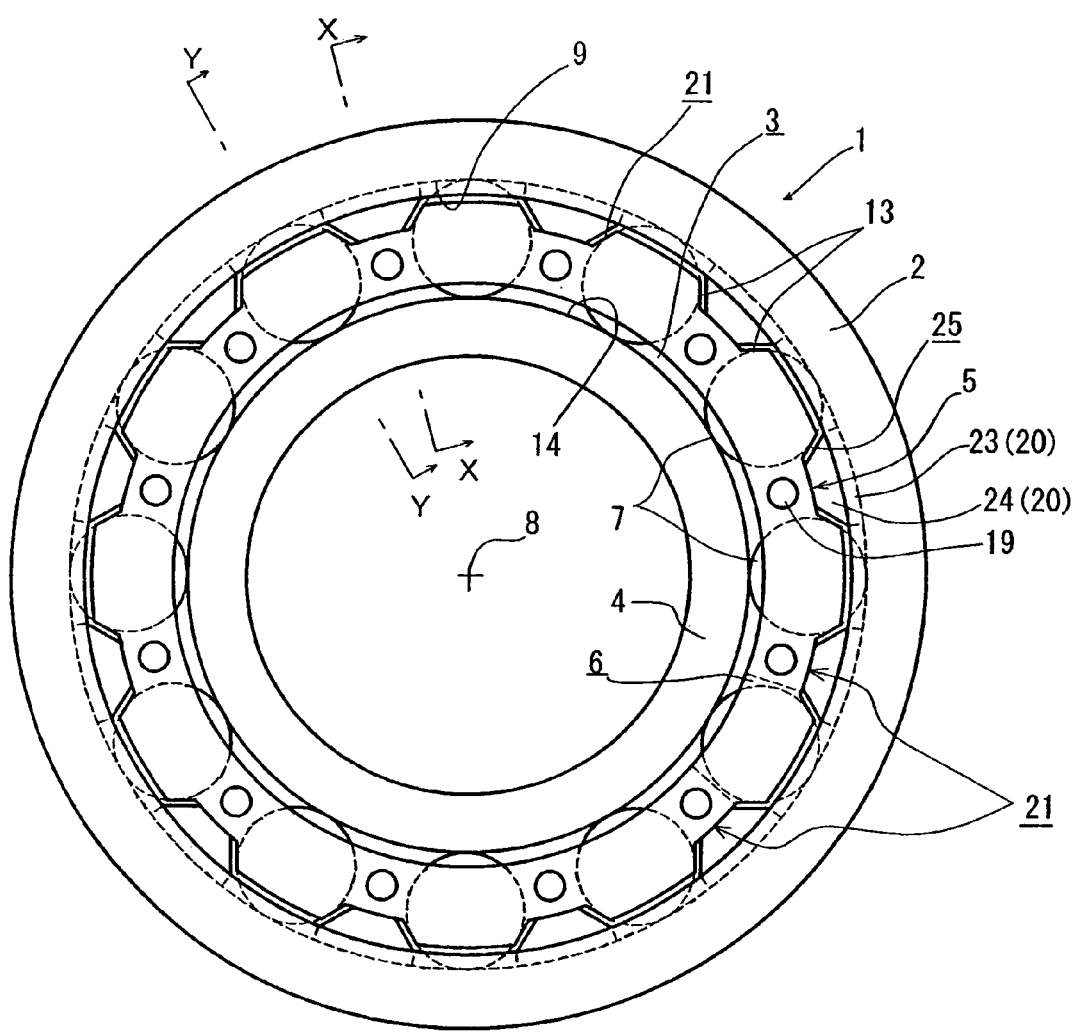
FIG. 1 is a front elevational view of a whole of a rolling bearing, in accordance with a best embodiment of the present invention.
Figure 2:
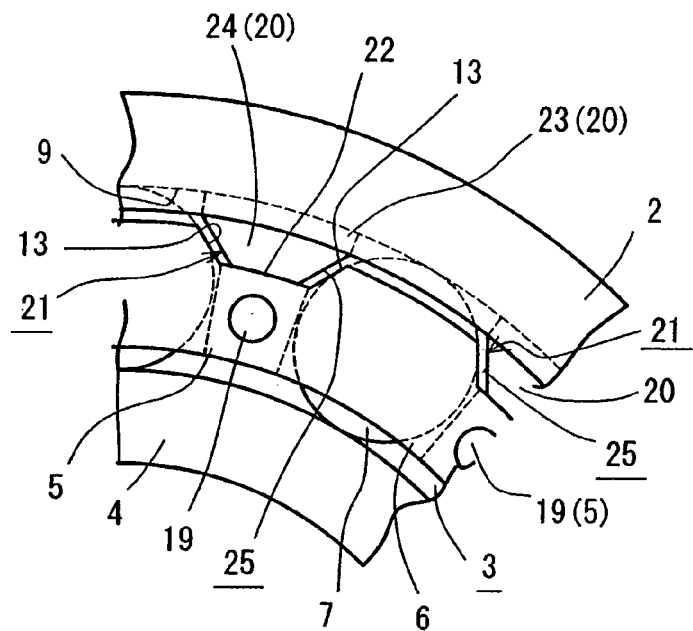
FIG. 2 is a partly enlarged view of the rolling bearing.
Figure 3:
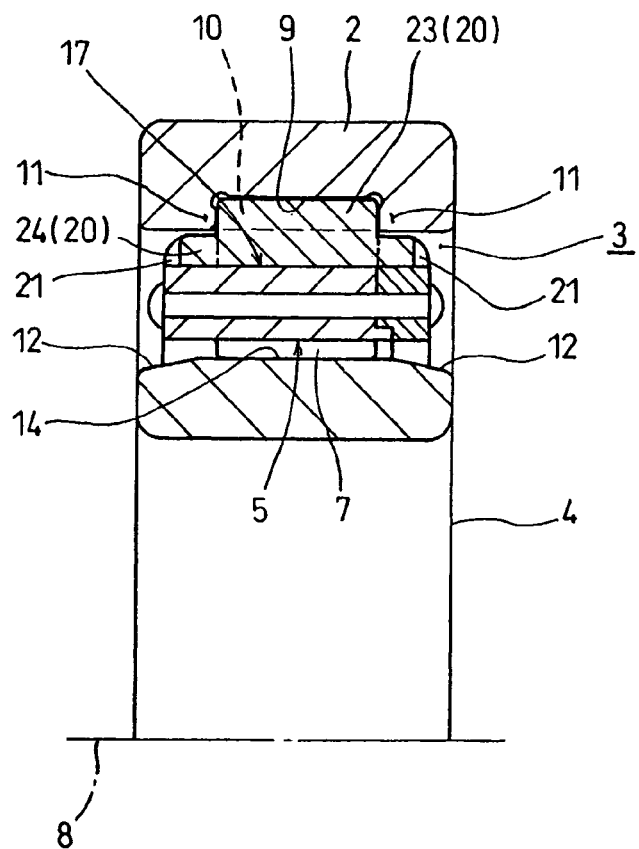
FIG. 3 is an enlarged cross sectional view along a line X—X in FIG. 1.
Figure 4:
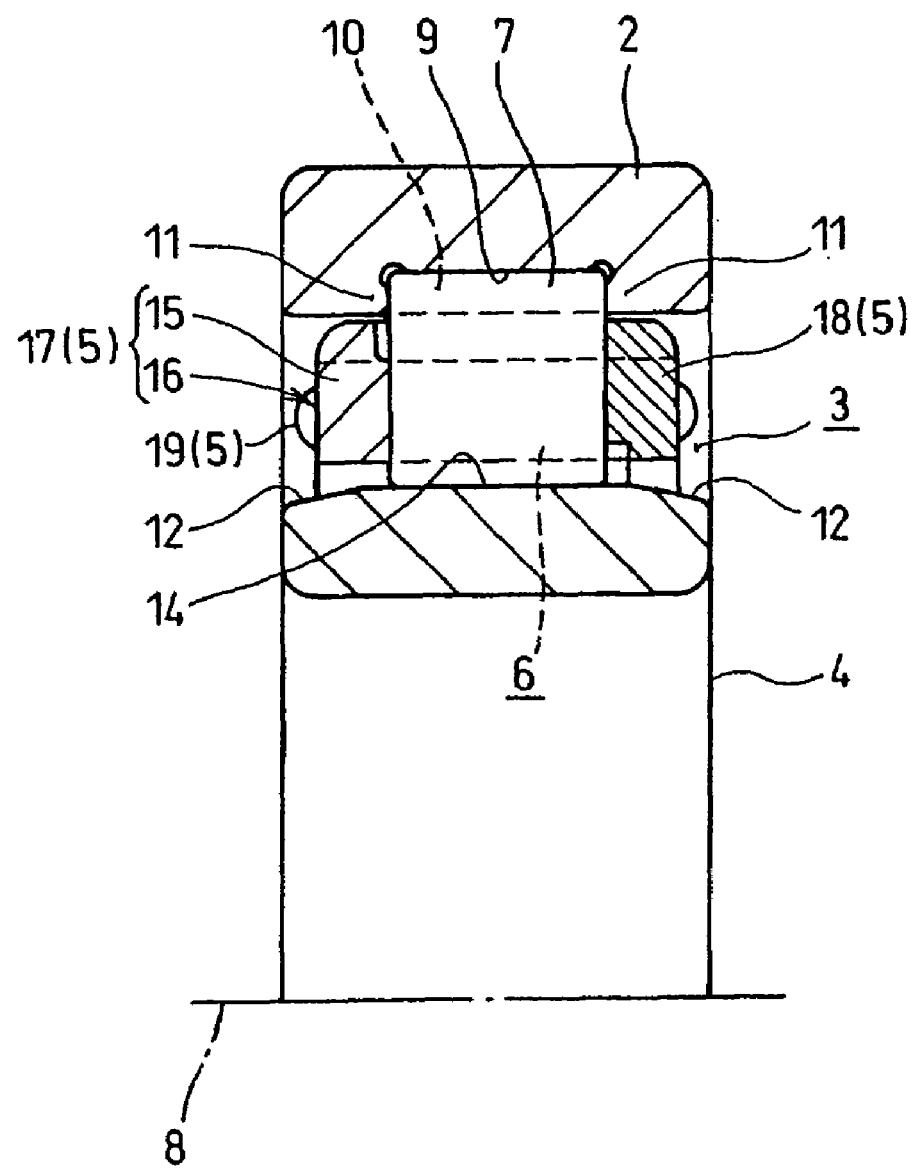
FIG. 4 is an enlarged cross sectional view along a line Y—Y in FIG. 1.
Figure 5:
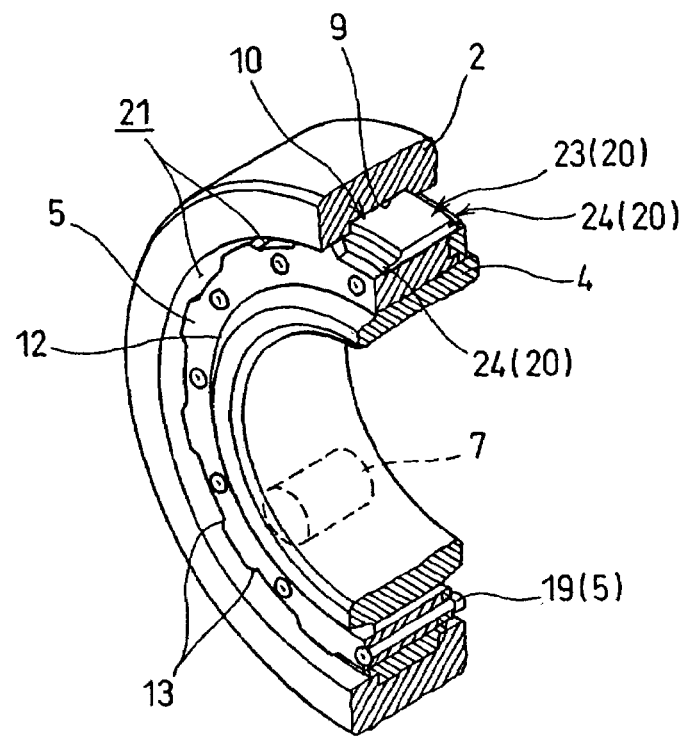
FIG. 5 is an enlarged perspective view of the rolling bearing in a partly rupturing manner.
Figure 6:
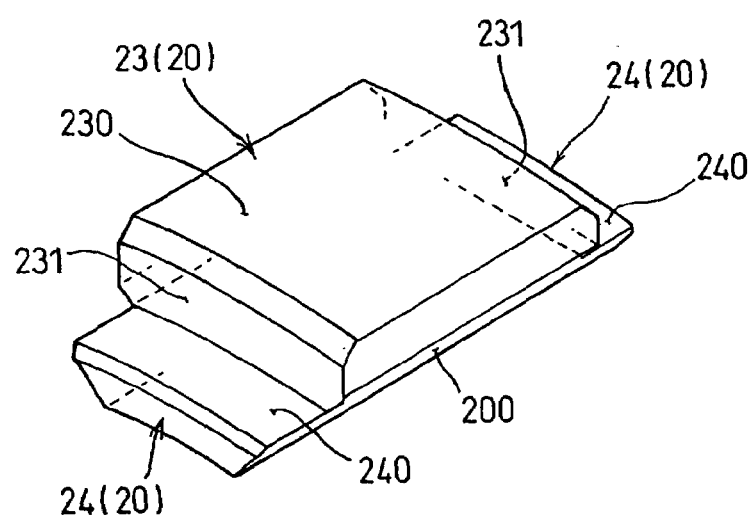
FIG. 6 is an enlarged perspective view of a solid lubricating agent of the rolling bearing.

FIGS. 1 to 6 relates to a best embodiment, in accordance with the present invention. A description is given below of a rolling bearing, in accordance with the best embodiment of the present invention. With reference to these drawings, reference numeral 1 denotes a rolling bearing. The rolling bearing 1 has a structure of radial roller bearing (a cylindrical roller bearing), and is used, for example, in a machine tool, or the like. The roller bearing 1 is provided with an outer ring 2 corresponding to one bearing ring arranged in an outer side in a diametrical direction, and an inner ring 4 corresponding to another bearing ring arranged in an inner side in the diametrical direction with respect to the outer ring 2. The outer ring 2 and the inner ring 4 are arranged in a state, in which opposing surfaces thereof are opposed to each other via an annular space 3 in the diametrical direction. The roller bearing 1 further has a cage 5 arranged in the annular space 3, and a cylindrical roller 7 received in a rolling element receiving pocket 6 formed in the cage 5 at uniformly arranged positions in a circumferential direction. The rolling bearing 1 is of an outer ring guide type, in which the inner ring 4 is not rotated, the outer ring 2 is freely rotated around an axis 8, and an outer peripheral surface of the cage 5 is guided along an inner peripheral surface of the outer ring 2.

The outer ring 2 is provided with a groove portion 10 forming an outer ring raceway surface 9 of the cylindrical roller 7 in an inner peripheral side thereof, and is provided with a collar portion 11 (a shoulder portion) for holding the cylindrical roller 7 in the axial direction 8 in both sides of the groove portion 10 in the axial direction 8. The inner ring 4 is provided with an inclined surface 12 for assembling formed in both sides of the inner peripheral surface in the axial direction 8. A portion between the inclined surfaces 12 is formed as an inner ring raceway surface 14 of the cylindrical roller 7.

The outer ring 2 and the inner ring 4 mentioned above are formed by a bearing steel, such as a high speed tool steel, or the like (for example, SKH4 is employed), and is titanium-coated so as to resist under a high temperature, for example, by TiN. The cylindrical roller 7 is formed by a ceramics. The ceramics is constituted by setting a silicon nitride ($Si_3N_4$) to a main component and adding an appropriate sinter assisting component. As the sinter assisting component, there is employed an aluminum nitride (AlN), a titanium oxide ($TiO_2$), a spinel ($MgAl_2O_4$), or the like, in addition to an yttria ($Y_2O_3$) and an alumina ($Al_2N_3$).

The cage 5 is constituted by an annular portion 17 integrally formed by a first roller holding surface portion 15 holding the cylindrical roller 7 by one side in the axial direction 8 and a holding portion 16 having the pocket 6, a second roller holding surface portion 18 holding the cylindrical roller 7 by another side in the axial direction 8, and a plurality of rivets 19 for integrally forming the annular portion 17 and the second roller holding surface portion 18. The annular portion 17 and the second roller holding surface portion 18 are integrally formed by caulking both end portions in a state, in which the rivets 19 pass through both the roller holding surface portions 15 and 18. The cage 5 mentioned above is formed by a stainless bearing steel or a carbon steel, for example, steel kinds SUS304, SUS316, SUS630, S25C are employed. A coating of TiN mentioned above may be applied onto a surface of the cage 5.

There is provided a plurality of solid lubricating agents 20 for lubricating the outer ring raceway surface 9, the inner ring raceway surface 14 and the collar portion 11, in accordance with a rotating motion of the cage 5 around the axis. The solid lubricating agent 20 has a solid form, and is attached over engaging recess portions 21 formed in outer peripheral portions of both the holding surface portions 15 and 18. The engaging recess portions 21 are formed at uniformly arranged positions of both the roller holding surface portions 15 and 18 in a circumferential direction. The engaging recess portions 21 are arranged between the pockets 6 in the cage 5, in other words, positions corresponding to portions between the rollers in the cage 5. The engaging recess portion 21 has a bottom surface 22, and a pair of inclined surface 13 inclined in such a manner as to expand toward an outer side in the diametrical direction from both sides of the bottom surface 22 in a circumferential direction.

The solid lubricating agent 20 is integrally formed by a first lubricating portion 23 detachably fitted to the groove portion 10 of the outer ring 2, and a second lubricating portion 24 bulging out to both sides of the first lubricating portion 23 in the axial direction 8 so as to be loosely fitted to the engaging recess portion 21. The solid lubricating agent 20 is formed by a graphite. Alternatively, the solid lubricating agent 20 is formed by a laminated material, such as tungsten disulfide, molybdenum disulfide, or the like, a soft metal material, such as gold, silver, lead, or the like, and a polymer resin material, such as PTFE, polyimide, or the like.

An outer peripheral surface 230 of the first lubricating portion 23 is formed so as to have the same curvature as that of the outer ring raceway surface 9, and is slidably in contact with the outer ring raceway surface 9, in accordance with the rotation of the outer ring 2. A side surface 231 of the first lubricating portion 23 is slidably in contact with both wall surfaces of the groove portion 10, in accordance with the rotation of the outer ring 2. An outer peripheral surface 240 of the second lubricating portion 24 is formed so as to have the same curvature as that of an inner peripheral surface of the collar portion 11, and is slidably in contact with the inner peripheral surface of the collar portion 11, in accordance with the rotation of the outer ring 2. A back surface 200 of the solid lubricating agent 20 (the first lubricating portion 23 and the second lubricating portion 24) is slidably in contact with a rolling surface of the cylindrical roller 7 in a downstream side of the solid lubricating agent 20 in a rotating direction at a time when the outer ring 2 is rotated. A height of the first lubricating portion 23 in a diametrical direction is approximately equal to a distance from the outer ring raceway surface 9 to an outer peripheral surface of the annular portion 17. A width of the first lubricating portion 23 in an axial direction 8 is approximately equal to a distance between both the wall surfaces of the groove portion 10. A height of the second lubricating portion 24 in the diametrical direction is approximately equal to a distance from the bottom surface 22 of the engaging recess portion 21 to the inner peripheral surface of the collar portion 11 in the outer ring 2. A width of the entire solid lubricating agent 20 in the axial direction 8 is slightly smaller than the width of the cage 5. A small clearance 25 is provided between the inclined surface 13 of the engaging recess portion 21 and the cylindrical roller 7, and the back surface 200 of the solid lubricating agent 20 opposing to the inclined surface 13.

The rolling bearing 1 having the structure mentioned above is assembled, in accordance with the following procedures. (1) Scuffing the graphite on both the wall surfaces of the outer ring raceway surface 9 and the groove portion 10 in the outer ring 2, and the inner peripheral surface of the collar portion 11 (the guide surface of the cage 5). (2) Fitting a plurality of solid lubricating agents 20 to the groove portion 10 so as to hold them at the predetermined circumferential uniformly arranged positions. (3) Scuffing the graphite on both the side end surfaces of the cylinder roller 7 and attaching the cylindrical roller 7 between the solid lubricating agents 20 so as to hold them. (4) Attaching the annular portion 17 from one side in the axial direction 8 in such a manner as to align the pocket 6 with the position of the cylindrical roller 7 and position the engaging recess portion 21 to the solid lubricating agent 20. (5) Attaching the second roller holding surface portion 18 from another side in the axial direction 8 in such a manner as to position the engaging recess portion 21 to the solid lubricating agent 20. (6) Inserting a plurality of rivets 19 to the annular portion 17 and the second roller holding surface portion 18 and caulking both end portions thereof. (7) Assembling the inner ring 4 after scuffing the graphite on the inner ring raceway surface 14 of the inner ring 4. The rolling bearing 1 is assembled, in accordance with the above steps.

In the rolling bearing 1, when the outer ring 2 is rotated around the axis 8, the cage 5 is rotated around the axis 8, in accordance with the rolling of the cylindrical roller 7. Each of the solid lubricating agents 20 revolves around the axis 8 accordingly. At this time, the outer peripheral surface 230 of the first lubricating portion 23 in each of the solid lubricating agents 20 is slidably in contact with the outer ring raceway surface 9 or slides on the outer ring raceway surface 9 so as to lubricate the outer ring raceway surface 9. Further, the side surface 231 of the first lubricating portion 23 is slidably in contact with both the wall surfaces of the groove portion 10 so as to lubricate the groove portion 10. The outer peripheral surface 240 of the second lubricating portion 24 is slidably in contact with the inner peripheral surface of the collar portion 11 corresponding to the guide surface of the cage 5 so as to lubricate the inner peripheral surface of the collar portion 11.

At this time, since the slight clearance 25 is formed between the inclined surface 13 of the engaging recess portion 21 and the back surface 200 of the solid lubricating agent 20 opposing to the inclined surface 13, the solid lubricating agent 20 starts a revolving motion behind the rotation of the cage 5 by a degree of the clearance 25. Accordingly, the back surface 200 of the solid lubricating agent 20 is slidably in contact with the rolling surface (the front surface) of the cylindrical roller 7 in the downstream side of the solid lubricating agent 20 in the rotating direction so as to lubricate the rolling surface of the cylindrical roller 7. When the first lubricating portion 23 of the sold lubricating agent 20 lubricates the outer ring raceway surface 9, and the back surface 200 of the solid lubricating agent 20 lubricates the raceway surface of the cylindrical roller 7, the inner ring raceway surface 14 is lubricated.

In the case that the lead-lag is generated in a part of a plurality of cylindrical rollers 7, in accordance with the rotation of the outer ring 8 around the axis 8, the cylindrical roller 7 is brought into contact with the peripheral wall of the pocket 6 in the cage 5, so that there is a case that the cage 5 is exposed to a compression force in the peripheral direction particularly with respect to an adjacent cylindrical roller 7.

However, as mentioned above, since the slight clearance 25 is provided between the inclined surface 13 of the engaging recess portion 21 and the back surface 200 of the solid lubricating agent 20 opposing to the inclined surface 13, no compression force is applied to the solid lubricating agent 20. Accordingly, even if the lead-lag is generated in a part of the cylindrical rollers 7, a phenomenon that the solid lubricating agent 20 is broken away due to the lead-lag can be prevented.

Further, when the solid lubricating agent 20 revolves around the axis 8 and is slidably in contact with both the wall surfaces of the groove portion 10 and the inner peripheral surface of the collar portion 11 so as to lubricate, the height of the solid lubricating agent 20 in the diametrical direction is reduced step by step. However, since the inclined surface 13 is formed in the engaging recess portion 21, the solid lubricating agent 20 is pressed to the outer side in the diametrical direction by the inclined surface 13, in accordance with the rotation of the cage 5 around the axis 8. Accordingly, even in the case that the height of the solid lubricating agent 20 in the diametrical direction is reduced, in accordance with the use, it is possible to keep the operation that the solid lubricating agent 20 is slidably in contact with both the wall surfaces of the groove portion 10 and the inner peripheral surface of the collar portion 11 so as to lubricate, in accordance with the rotation of the cage 5 around the axis 8.

In particular, in the case of applying a rolling bearing corresponding to model number NU206 (inner diameter 30 mm, outer diameter 62 mm, width 16 mm), as the rolling bearing 1, in accordance with the present invention to a machine tool under a working environment comprising a working temperature: 550° C., a radial load: 1.2 ton and a rotation number: 300 rpm, the cylindrical roller 7 and the solid lubricating agent 20 stands against the working over eight hours without breaking away.

In accordance with the structure mentioned above, the clearance 25 is provided between the inclined surface 13 of the engaging recess portion 21 in the cage 5, and the back surface 200 (the opposing surface) of the solid lubricating agent 20 opposing to the inclined surface 13. Further, since the compression force caused by the lead-lag of the cylindrical roller 7 is supported by the cage 5, the compression force can be prevented from being applied to the solid lubricating agent 20. Accordingly, the solid lubricating agent 20 can be prevented from being broken away due to the lead-lag of the cylindrical roller 7 so as to lubricate the necessary surface.

Further, since the inclined surface 13 is formed in the engaging recess portion 21 of the cage 5, the solid lubricating agent 20 is pressed to the outer side in the diametrical direction by the inclined surface 13, in accordance with the rotation of the cage 5 around the axis 8 even in the case that the height of the solid lubricating agent 20 in the diametrical direction is reduced in correspondence to the working. Accordingly, it is possible to maintain the operation that the solid lubricating agent 20 is slidably in contact with both the wall surfaces of the groove portion 10 and the inner peripheral surface of the collar portion 11 so as to lubricate, for a long period (a long time) even under a severe working environment.

Figure 7:
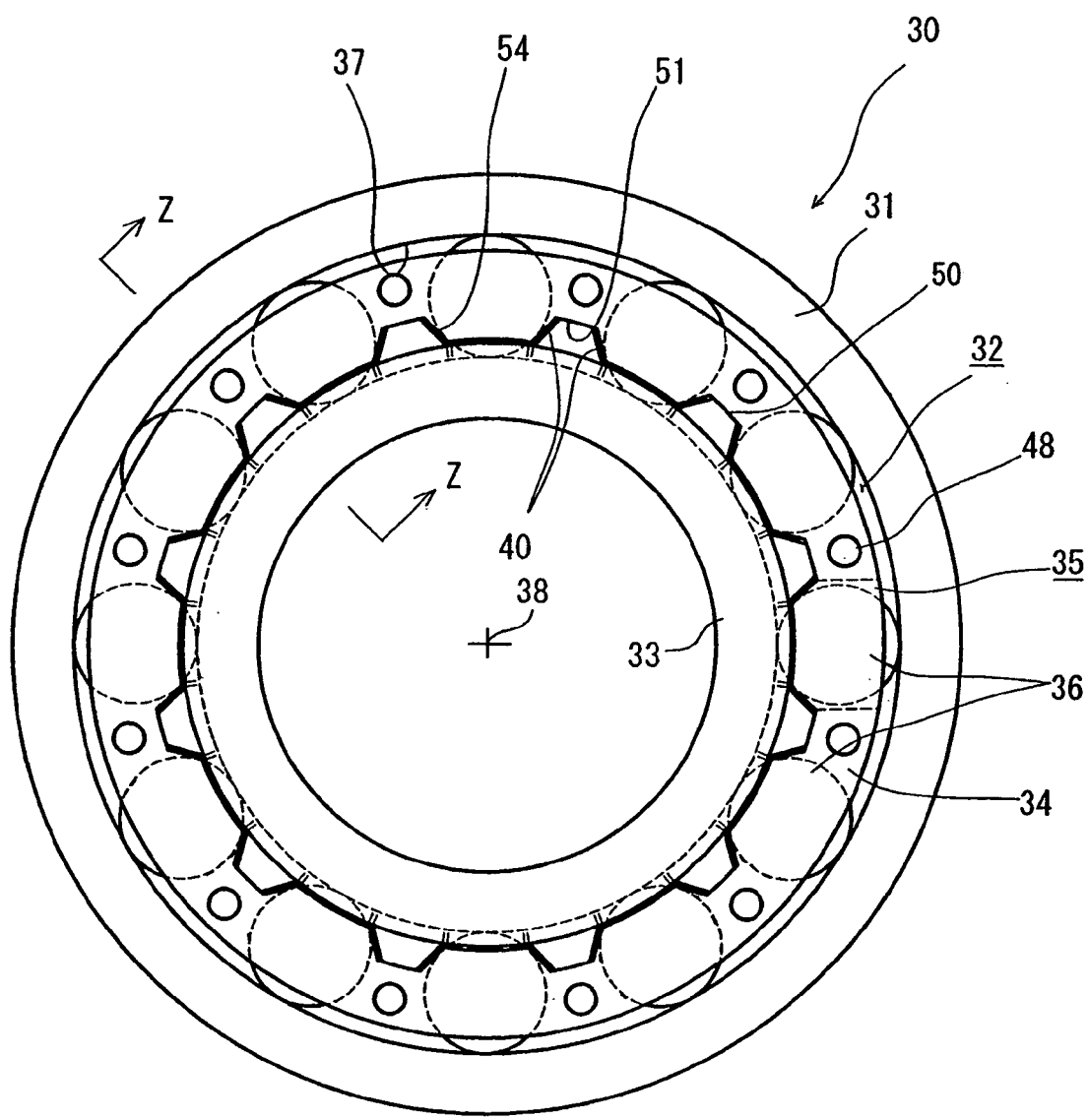
FIG. 7 is a front elevational view of a whole of a rolling bearing, in accordance with another embodiment of the present invention.
Figure 9:
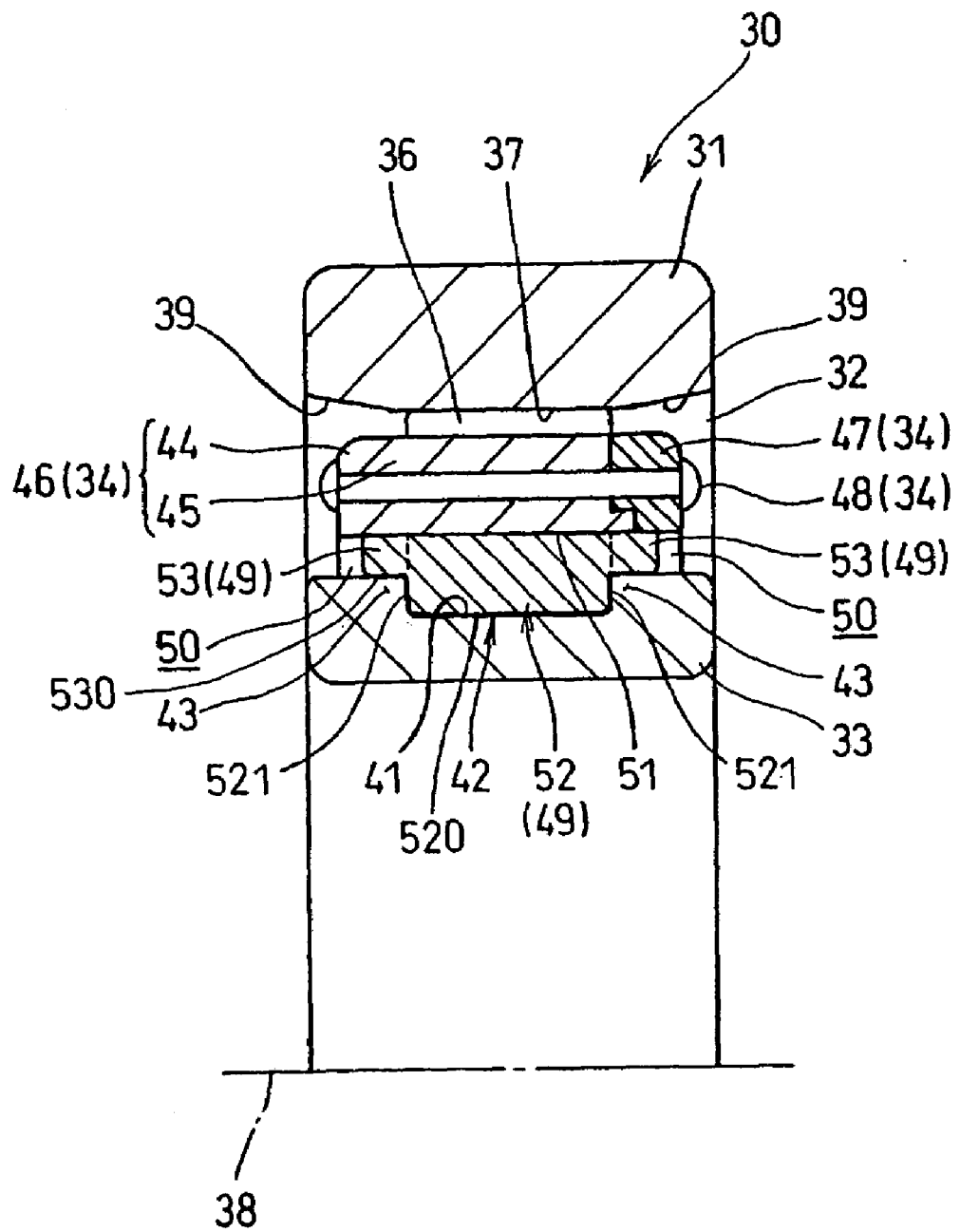
FIG. 9 is an enlarged cross sectional view along a line Z—Z in FIG. 7.

A description is given of another embodiment, in accordance with the present invention with reference to FIGS. 7 to 9. A rolling bearing, in accordance with this embodiment is of an inner ring guide type. FIG. 7 is a front elevational view of a whole of the rolling bearing, FIG. 8 is a partly enlarged view of the rolling bearing, and FIG. 9 is an enlarged cross sectional view along a line Z—Z in FIG. 7. In these figures, reference numeral 30 denotes a rolling bearing. The rolling bearing 30 has an outer ring 31, an inner ring 33 arranged in an inner side of the outer ring 31 via an annular space 32, a cage 34 arranged in the annular space 32, and a cylindrical roller 36 receives in a pocket 35 formed in the cage 34 at uniformly arranged positions in a circumferential direction.

As illustrated, the outer ring 31 is provided with an outer ring raceway surface 37 of the cylindrical roller 36 formed in an inner peripheral side thereof. An inclined surface 39 for assembling is formed in both sides of the outer ring raceway surface 37 in a direction of an axis 38.

A groove portion 42 forming an inner ring raceway surface 41 of the cylindrical roller 36 is formed in an outer peripheral surface of the inner ring 33, and a collar portion 43 for holding the cylindrical roller 36 in the direction of the axis 38 is formed in both sides of the groove portion 42 in the direction of the axis 38.

The structure of the cage 34 is the same as that of the embodiment mentioned above. In other words, the cage 34 is constituted by an annular portion 46 integrally forming a holding portion 45 having a first roller holding surface portion 44 and the pocket 35, a second roller holding surface portion 47, and a plurality of rivets 48. In this case, the rivets 48 are positioned in an outer side in a diametrical direction in comparison to the first embodiment.

There are provided a plurality of solid lubricating agents 49 for lubricating the inner ring raceway surface 41, the outer ring raceway surface 37 and the collar portion 43, in accordance with the rotation of the cage 34 around the axis 38. These solid lubricating agents 49 are respectively attached to a plurality of engaging recess portions 50 formed in inner peripheral portions of both the holding surface portions 44 and 47 of the cage 34. The engaging recess portions 50 are arranged between the pockets 35 in both the roller holding surface portions 44 and 47, in other words, positions corresponding to portions between the rollers in the cage 34. The engaging recess portion 50 in both the holding surface portions 44 and 47 has a bottom surface 51 in an outer side in the diametrical direction, and an inclined surface 40 inclined in such a manner as to expand toward an inner side in the diametrical direction from both sides of the bottom surface 51 in a circumferential direction, and is formed in an approximately trapezoidal shape in a front view.

The solid lubricating agent 49 is integrally formed by a first lubricating portion 52 detachably fitted to the groove portion 42 of the inner ring 33, and a second lubricating portion 53 bulging out to both sides of the first lubricating portion 52 in the direction of the axis 38 so as to be loosely fitted to the engaging recess portion 50.

An inner peripheral surface 520, which is slidably in contact with the inner ring raceway surface 41, in accordance with the rotation of the inner ring 33 and has the same curvature as that of the inner ring raceway surface 41 is formed in the first lubricating portion 52. A side surface 521, which is slidably in contact with both wall surfaces of the groove portion 42, in accordance with the rotation of the inner ring 33 is formed in the first lubricating portion 52. An inner peripheral surface 530, which is formed so as to have the same curvature as that of an outer peripheral surface of the collar portion 43, and is slidably in contact with the outer peripheral surface of the collar portion 43, in accordance with the rotation of the inner ring 33 is formed in the second lubricating portion 53. A back surface 490, which is slidably in contact with a rolling surface of the cylindrical roller 36 in a downstream side of the solid lubricating agent 49 in a rotating direction at a time when the inner ring 33 is rotated is formed in the solid lubricating agent 49 (the first lubricating portion 52 and the second lubricating portion 53).

A height of the first lubricating portion 52 in a diametrical direction is formed at an approximately equal distance to a distance from the inner ring raceway surface 41 to an inner peripheral surface of the annular portion 46. A width of the first lubricating portion 52 in the direction of the axis 38 is formed at an approximately equal width to a distance between both the wall surfaces of the groove portion 42.

A height of the second lubricating portion 53 in the diametrical direction is formed so as to be approximately equal to a distance from the bottom surface 51 of the engaging recess portion 50 to the outer peripheral surface of the collar portion 43. A small clearance 54 is provided between the inclined surface 40 of the engaging recess portion 50 and the back surface 490 of the solid lubricating agent 49 opposing to the inclined surface 40. In this case, a width of the entire solid lubricating agent 49 in the direction of the axis 38 is set to be slightly smaller than the width of the cage 34. Further, the outer ring 31, the inner ring 33, the cage 34 and the solid lubricating agent 49 are respectively formed by the same material as those in the first embodiment mentioned above.

Next, a description is given of an assembling procedures of the rolling bearing 30 having the structure mentioned above. (1) Scuffing the graphite on the inner ring raceways surface 41 of the inner ring 33, both the wall surfaces of the groove portion 42, and the outer peripheral surface (the guide surface of the cage 34). (2) Fitting a plurality of solid lubricating agents 49 to the groove portion 42 so as to hold them at the predetermined circumferential uniformly arranged positions. (3) Scuffing the graphite on both the side end surfaces of the cylinder roller 36 and attaching the cylindrical roller 36 between the solid lubricating agents 49 so as to hold them. (4) Attaching the annular portion 46 from one side in the direction of the axis 38 in such a manner as to align the pocket 35 with the position of the cylindrical roller 36 and position the engaging recess portion 50 to the solid lubricating agent 49. (5) Attaching the second roller holding surface portion 47 from another side in the direction of the axis 38 in such a manner as to position the engaging recess portion 50 to the solid lubricating agent 49. (6) Inserting a plurality of rivets 48 to the annular portion 46 and the second roller holding surface portion 47 and caulking both end portions thereof. (7) Assembling the outer ring 31 after scuffing the graphite on the outer ring raceway surface 37 of the outer ring 31. The rolling bearing 30 is assembled, in accordance with the above steps.

In the rolling bearing 30 having the structure mentioned above, when the inner ring 33 is rotated around the axis 38, the cage 34 is rotated around the axis 38, in accordance with the rolling of the cylindrical roller 36. The solid lubricating agents 49 revolve around the axis 38 accordingly. At this time, the inner peripheral surface 520 of the first lubricating portion 52 is slidably in contact with the inner ring raceway surface 41 so as to lubricate the inner ring raceway surface 41. Further, the side surface 521 of the first lubricating portion 52 is slidably in contact with both the wall surfaces of the groove portion 42 so as to lubricate the groove portion 42.

Further, the inner peripheral surface 530 of the second lubricating portion 53 is slidably in contact with the outer peripheral surface of the collar portion 43 corresponding to the guide surface of the cage 34 so as to lubricate the outer peripheral surface of the collar portion 43. At this time, since the slight clearance 54 is formed between the inclined surface 40 of the engaging recess portion 50 and the back surface 490 of the solid lubricating agent 49 opposing to the inclined surface 40, the solid lubricating agent 49 starts a revolving motion behind the rotation of the cage 34 by a degree of the clearance 54. Accordingly, the back surface 490 of the solid lubricating agent 49 is slidably in contact with the rolling surface of the cylindrical roller 36 in the downstream side of the solid lubricating agent 49 in the rotating direction so as to lubricate the rolling surface of the cylindrical roller 36. In this case, when the solid lubricating agent 49 lubricates the rolling surface of the cylindrical roller 36, the outer ring rolling surface 37 is lubricated.

In the case that the lead-lag is generated in a part of a plurality of cylindrical rollers 36, in accordance with the rotation of the inner ring 33 around the axis 38, the cylindrical roller 36 is brought into contact with the peripheral wall of the pocket 35 in the cage 34, so that there is a case that the cage 34 is exposed to a compression force in the peripheral direction particularly with respect to an adjacent cylindrical roller 36. However, as mentioned above, since the slight clearance 54 is provided between the inclined surface 40 of the engaging recess portion 50 and the back surface 490 of the solid lubricating agent 49 opposing to the inclined surface 40, no compression force is applied to the solid lubricating agent 49. Accordingly, even if the lead-lag is generated in a part of the cylindrical rollers 36, a phenomenon that the solid lubricating agent 49 is broken away due to the lead-lag can be prevented.

Further, when the solid lubricating agent 49 revolves around the axis 38 and is slidably in contact with both the wall surfaces of the groove portion 42 and the inner peripheral surface of the collar portion 43 so as to lubricate, the height of the solid lubricating agent 49 in the diametrical direction is reduced step by step. However, since the inclined surface 40 is formed in the engaging recess portion 50, the solid lubricating agent 49 is pressed to the inner side in the diametrical direction by the inclined surface 40, in accordance with the rotation of the cage 34 around the axis 38. Accordingly, even in the case that the height of the solid lubricating agent 49 in the diametrical direction is reduced, in accordance with the use, it is possible to keep the operation that the solid lubricating agent 49 is slidably in contact with both the wall surfaces of the groove portion 42 and the inner peripheral surface of the collar portion 43, in accordance with the rotation of the cage 34 around the axis 38.

In the case of the rolling bearing mentioned above, the clearance 54 is provided between the inclined surface 40 of the engaging recess portion 50 in the cage 34, and the opposing surface of the back surface 490 of the solid lubricating agent 49 opposing to the inclined surface 40. Further, since the compression force caused by the lead-lag of the cylindrical roller 36 is supported by the cage 34, the compression force can be prevented from being applied to the solid lubricating agent 49. Accordingly, the solid lubricating agent 49 can be prevented from being broken away due to the lead-lag of the cylindrical roller 36 so as to lubricate the necessary surface.

Further, since the inclined surface 40 is formed in the engaging recess portion 50 of the cage 34, the solid lubricating agent 49 is pressed to the inner side in the diametrical direction by the inclined surface 40, in accordance with the rotation of the cage 34 around the axis 38 even in the case that the height of the solid lubricating agent 49 in the diametrical direction is reduced in correspondence to the working. Accordingly, it is possible to maintain the operation that the solid lubricating agent 49 is slidably in contact with both the wall surfaces of the groove portion 42 and the inner peripheral surface of the collar portion so as to lubricate, for a long period.

In this case, the present invention is not limited to the cylindrical roller serving as the rolling element, but can be applied to a rolling bearing using balls. In this case, in the same manner as mentioned above, the engaging recess portion is formed in the outer side portion in the diametrical direction between the pockets in the cage for the balls or the inner side portion in the diametrical direction, and the solid lubricating agent is attached to the engaging recess portion in such a manner that the solid lubricating agent can move slightly in the peripheral direction, thereby lubricating a ball raceway surface. In this case, since the cage supports the compression force, in accordance with the lead-lag of the ball, the bearing can be used for a long period without breaking away the solid lubricating agent, and the raceway surface can be lubricated.

The solid lubricating agent, in accordance with the present invention may be constituted by a solid lubricating agent, which can lubricate at least the outer ring raceway surface or the inner ring raceway surface among the outer ring raceway surface or the inner ring raceway surface, both the wall surfaces of the groove portion, and the guide surface of the cage in the collar portion. In this case, the solid lubricating agent is structured such that the solid lubricating agent is attached to the recess portion formed in the outer side portion of the cage in the diametrical direction or the inner side portion in the diametrical direction and lubricates the outer ring raceway surface or the inner ring raceway surface, in accordance with the rotation of the cage.

INDUSTRIAL APPLICABILITY

In accordance with the present invention, it is possible to apply to the rolling bearing used under the high temperature and the high pressure.

The invention claimed is:

1. A rolling bearing, comprising:
an inner bearing ring;
an outer bearing ring disposed radially outward of said inner bearing ring;
a cage arranged in an annular space between said inner and outer bearing rings, said cage including rolling element receiving pockets arranged in a circumferential direction, and further including recess portions between the rolling element receiving pockets in the circumferential direction;
rolling elements which are received in the rolling element receiving pockets; and
at least one integrally formed solid lubricating agent which is at least partially received in the recess portions so as to captively move along with the cage and be in slidable contact with a rolling element raceway surface of one of said inner and outer bearing rings facing said cage.

2. A rolling bearing as claimed in claim 1, wherein the at least one integrally formed solid lubricating agent has a first lubricating portion, which is slidably in contact with said raceway surface of said one of said inner and outer bearing rings, and a second lubricating portion, which is slidably in contact with a guide surface in a shoulder portion of said one of said inner and outer bearing rings.

3. A rolling bearing as claimed in claim 1, further comprising an inclined surface which is disposed in the recess portion pressing the at least one integrally formed solid lubricating agent in a diametrical direction in accordance with a rotating motion of the cage around the axis.

4. A rolling bearing as claimed in claim 1, wherein the solid lubricating agent is formed by a graphite.

5. A rolling bearing as claimed in claim 1, wherein the at least one integrally formed solid lubricating agent is engaged with the recess portion so as to be moveable in a peripheral direction with respect to the cage.

6. A rolling bearing as claimed in claim 5, wherein the at least one integrally formed solid lubricating agent is engaged with the recess portion so as to be slidably in contact with an adjacent one of the rolling elements.

7. A rolling bearing, comprising:
   an inner bearing ring;
   an outer bearing ring disposed radially outward of said inner bearing ring forming an annular space therebetween;
   a cage arranged in the annular space between said inner and outer bearing rings, said cage having a plurality of rolling element receiving pockets arranged in a circumferential direction, said cage further including recess portions disposed between the rolling element receiving pockets in the circumferential direction, the recess portions each having a bottom surface and a pair of inclined surfaces inclined so as to be expanded from both sides of the bottom portion in a circumferential direction and radially outward;
   a plurality of rolling elements received in the rolling element receiving pockets in the cage; and
   at least one integrally formed solid lubricating agent being at least partially received in the recess portions in a state in which a back surface thereof is opposed to the inclined surface of the recess portion with a clearance therebetween, said at least one integrally formed solid lubricant including a first lubricating portion detachably fitted to the groove portion of the one bearing ring and a second lubricating portion bulged out to both sides of the first lubricating portion in the axial direction so as to be loosely fitted to the recess portion when at least partially received therein, a one of said inner and outer bearing rings including a groove portion forming a raceway surface of the rolling element on an opposing surface to another one of said inner and outer bearing rings, and a shoulder portion for holding the rolling element in both sides of the groove portion in an axial direction, both of said first and second lubricating portions having a back surface in a downstream side of said one of said bearing rings in a rotational direction.

* * * * *